United States Patent Office 3,605,937
Patented Sept. 20, 1971

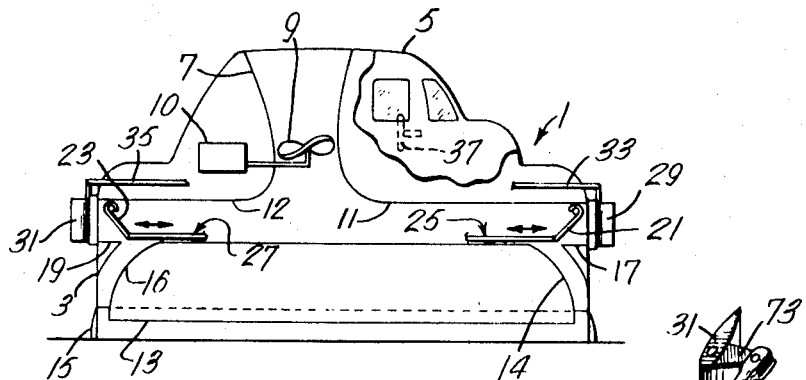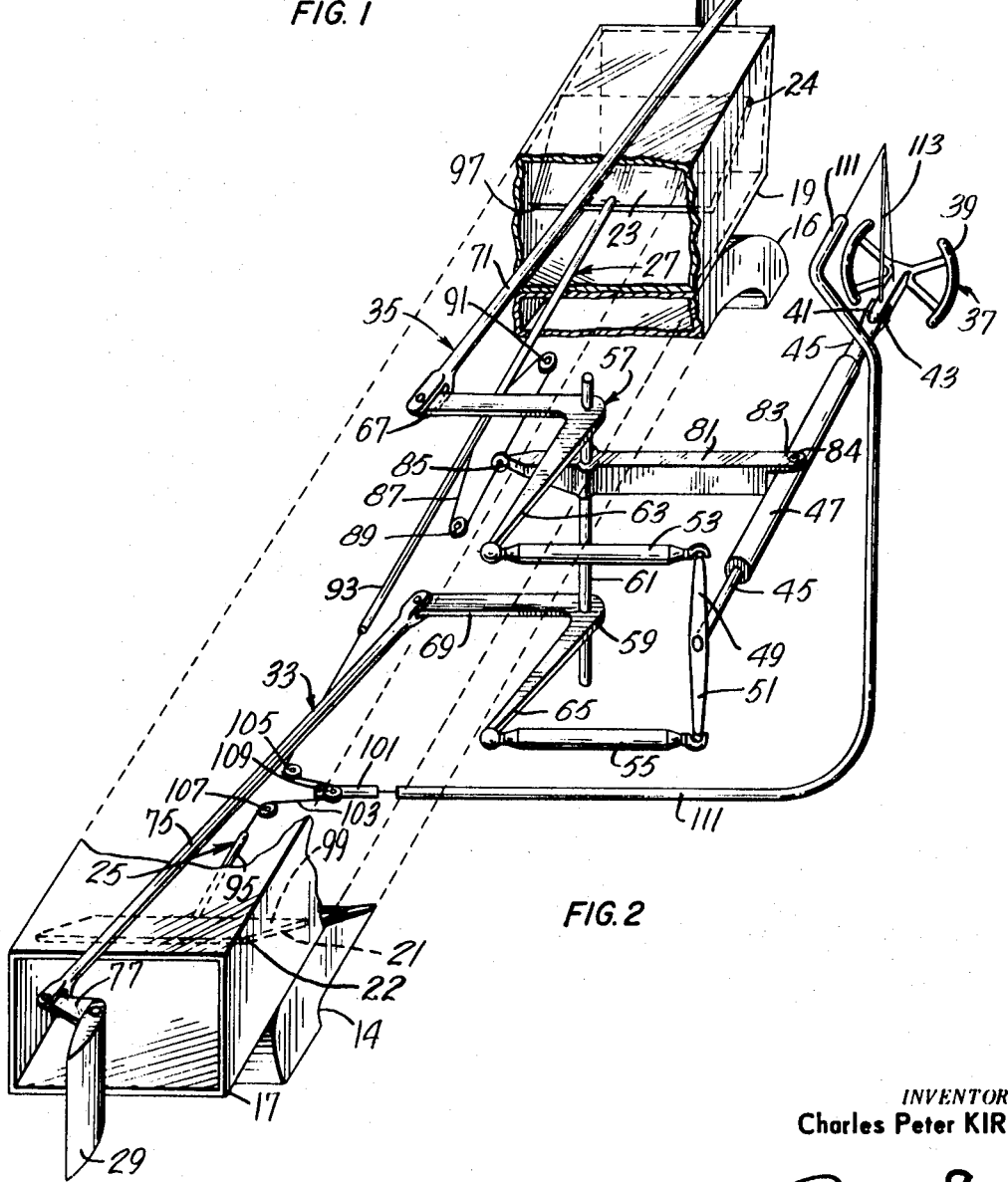
INVENTOR
Charles Peter KIRWAN
ATTORNEY

3,605,937
MOVEMENT CONTROL SYSTEM FOR FLUID
PRESSURE VEHICLES
Charles Peter Kirwan, Brossard, Quebec, Canada, assignor to Canive Industries Ltd., Brossard, Quebec, Canada
Filed Feb. 19, 1969, Ser. No. 800,454
Int. Cl. B60v 1/14
U.S. Cl. 180—120                                              6 Claims

ABSTRACT OF THE DISCLOSURE

A control system for air-cushion vehicles requiring only a single control member to control, using a portion of the air pressure supplied to support the vehicle, the movement of the vehicle in one or more directions.

BACKGROUND OF THE INVENTION

Field of the invention

This invention relates to an improved system for controlling the directional movement of vehicles.

The invention is particularly directed toward vehicles having means providing a source of fluid pressure, which fluid pressure is used to propel the vehicle. Examples of such vehicles with which the invention could be used are V.T.O.L. aircraft and ships which use the discharge of fluids to provide propulsion. The invention is particularly directed, however, to providing an improved movement control or steering system for air-cushioned vehicles.

Description of prior art

It has been proposed to have fluid pressure propelled vehicles, particularly air-cushioned vehicles, directionally controlled by a plurality of control members such as a combination of rudder pedals and a steering wheel or two control arms. Typical examples of the use of a plurality of control members are shown in U.S. Pats. 3,189,112, inventor C. S. Cockerell, issued May 4, 1965; 3,205,960, inventor C. M. Sperazz, Sr., issued Sept. 14, 1965; and 3,265,142, inventor D. H. Winter, issued Aug. 9, 1966. In many of the control systems two or more independent and unrelated sources of fluid pressure are required to control movement of the vehicle in more than one direction, see U.S. Pat. 3,265,142 for example. The directional control systems using a plurality of control members and/or a plurality of independent pressure sources are therefore somewhat complicated and costly and thus not particularly well suited for use in small vehicles capable of carrying only a few passengers.

Control systems, employing more than one control member, are also somewhat difficult for the operator to become accustomed to, particularly when the directional movement desired of the vehicle requires operating at least two of the control members together and also when the movement desired is not correlated to the movement or operation of the several control members either when operated singly or in combination to obtain the desired motion.

It is a purpose of the present invention to provide a simple and relatively inexpensive system for controlling the directional movement of a fluid pressure propelled vehicle and particularly an air-cushioned vehicle.

SUMMARY OF INVENTION

The invention provides a system for controlling the directional movement of a vehicle, particularly an air-cushioned vehicle, through the use of a single control member. The single control member is arranged to provide a more natural manner of steering the vehicle. By a more natural manner it is meant that when it is desired to steer the vehicle in a certain direction or attitude, movement of the single control member in this direction or attitude will cause the vehicle to move in the said direction or attitude. The single control member is connected in the control system so that movement of the control member up or down will cause the vehicle to move up or down; movement of it from side to side will cause the vehicle to move from side to side; rotational movement of the member will cause the vehicle to rotate and movement of the member forward or backward will cause the vehicle to move forward or backward. Thus the direction of movement of the single control member by the vehicle operator will cause the vehicle to move in a similar direction.

The control system can utilize the existing source of fluid pressure, preferably compressed air used to propel the vehicle and no separate source of fluid pressure is required.

The movement control system of the present invention is directed toward use with a vehicle having a source of fluid pressure providing the motive power and comprises first means for directing fluid pressure from the vehicle in one direction to provide a component of force acting to support the vehicle, second and third means for directing fluid pressure from the vehicle in second and third directions to provide opposing horizontal components of force acting on the vehicle, and a single member controlling the flow of the fluid pressure through the first, second and third means so as to control the movement of the vehicle in various directions.

Preferably, the first means directs the fluid pressure vertically down and the second and third means direct the fluid pressure horizontally fore and aft of the vehicle.

The single control member can cause an increase or decrease in the flow of fluid pressure directed through either the second or third means to move the vehicle in a fore or aft direction.

The control member can also direct varying proportions of the flow of fluid pressure through the second and third means, in equal amounts, as compared through the first means, particularly when the first means directs the fluid flow downwardly. An increase in proportion of flow through the first means as compared through the second and third means will cause the vehicle to rise. A decrease in proportion of flow through the first means will cause the vehicle to descend.

Preferably, under steady state conditions, a first portion of the fluid flow will always pass, in equal portions, through the second and third means thus cancelling each other out and the remaining portion will pass through the first means, vertically downward to support the vehicle on a cushion of fluid.

The control member can also deflect the fluid flow passing through said second and third means in such a manner as to provide a resultant component of force tending to rotate the vehicle.

The control member can also deflect the fluid flow passing through the second and third means to provide a resultant component of lateral thrust on the vehicle to move it laterally to either side.

BRIEF DESCRIPTION OF THE DRAWINGS

The invention will now be described in detail having reference to the drawings wherein:

FIG. 1 is a schematic view of an air-cushioned vehicle incorporating the invention; and FIG. 2 is a detailed schematic view of a preferred embodiment of the control system for an air-cushioned vehicle.

DESCRIPTION OF THE PREFERRED EMBODIMENT

The movement control system can be adapted to most types of vehicles using fluid pressure as a propulsive force, such as boats operated by a water jet, V.T.O.L. or S.T.O.L. aircraft or air-cushioned vehicles. The invention in the present embodiment will be particularly described with respect to an air-cushioned vehicle. Such vehicles are well known wherein means are provided to provide a source of fluid pressure forming a cushion of air on which the vehicle is at least partially supported on the surface over which it travels. The fluid pressure or separate means are used to propel the vehicle over the surface as it is supported on the cushion of air.

As shown in FIG. 1, the air-cushion vehicle 1 comprises a shell or casing 3 with a cabin 5, for carrying the operator and passengers, centrally located on the casing. A central duct 7 extends through the cabin into the casing. A fan 9 driven by a motor 10 is located in the duct for compressing and forcing a fluid downwardly through the duct 7. The compressed fluid, for an air-cushion vehicle, is air. While a single fan system has been described, the fluid pressure source can comprise two or more fans interconnected by ducting.

The compressed air is carried from duct 7 through lateral ducts 11, 12, within the casing to the sides of the casing, and then downwardly, through support ducts 14, 16, which in turn supply the cushion system of the vehicle. The cushion system can comprise peripheral jets or a plurality of plenum chambers. The cushion systems are well known and no detailed description of their construction is necessary for an understanding of the invention. The pressurized air is contained underneath the vehicle casing 3 by a flexible skirting 15 surrounding the lower peripheral edge 13 of the casing to provide a cushion of air on which the vehicle rides on the surface, as is well known.

The vehicle is constructed with at least two steering openings or ducts 17, 19, for directing a portion of the compressed air laterally and preferably horizontally away from the vehicle. As shown in FIG. 1, the ducts 17, 19, extend horizontally fore and aft respectively from the lateral ducts 11, 12, which direct the pressurized air to the cushion support ducts 14, 16, to the bottom of the vehicle. The steering ducts are arranged to always direct a portion of the air flow from duct 7 from the vehicle in the fore and aft direction providing horizontal thrust forces in the steady state which cancel each other out. The steering ducts preferably are arranged so that air directed therefrom passes in a direction along a line, which line passes through the vertical central axis of the vehicle.

While two opposed steering ducts have been shown, four steering ducts or more could be used provided the resultant horizontal component of thrust they exert cancels out in a steady state and preferably arranged so that their resultant component of force in a horizontal direction passes through the vertical center of the vehicle.

Also, while the steering ducts 17, 19, as shown, extend in the horizontal direction, they could be angled up or down provided there is still a horizontal component of force exerted on the vehicle from the air emerging therefrom.

Control means are provided in the ducts for adjustably proportioning the amount of air flow through the support and steering ducts and/or for deflecting the air stream passing through the steering ducts. The control means operate to control the movement of the vehicle.

The flow proportioning control means preferably comprise movable panels 21, 23. Panel 21 is located in front steering duct 17 adjacent to its juncture with support duct 11 and panel 23 is located in a similar position in rear steering duct 19. Both panels 21, 23, are pivotably attached in the ducts by pivots 22, 24 and movable to vary the exit areas of the steering ducts, thus controlling the proportion of air passing through the steering ducts in relation to the air flow through ducts 14, 16. The panels 21, 23, are arranged so that they can never fully close and a portion of the air stream always flows through steering ducts 17, 19, In this condition however the air flow from each steering duct is equal and opposite to provide a steady state condition. In a partially closed position, the majority of the air flows through ducts 14, 16. When the panels are moved to a more open position a greater portion of the air flows through the steering ducts while the remainder of the air flow through ducts 14, 16, is still sufficient to provide an air cushion for the vehicle.

Operator controlled linkage means 25, 27, are connected to each panel to move both in unison, or alternatively, to open one panel more than the other. A preferred form of these panel linkage means will be described in detail.

The flow deflecting means associated with each steering duct preferably comprises a vertical, laterally movable duct in the air stream. Each vane 29, 31, is operator controlled by vane linkages 33, 35, to be moved in unison to one side or the other or to be moved to opposite sides. A preferred form of the vane linkages will be described below.

A single movable control member 37 is provided to permit the operator of the vehicle to control four types of vehicle movement; fore and aft movement, vertical movement, lateral movement, and rotational or turning movement. The control member 37 is connected to the movable panels 21, 23, and deflector vanes 29, 31, through linkages 25, 27, and 33, 35, to move them to steer the vehicle.

As shown in FIG. 2, the single control member 37 comprises a control wheel 39 axially mounted to a yoke 41. The control wheel 39 can pivot up or down about its pivot mounting 43 to the yoke. The yoke 41 is axially attached to one end of a rod member 45 which is rotatably mounted in an elongated collar member 47. The other end of rod member 45 has opposed arms 49, 51, connected to it and extending radially therefrom. Link arms 53, 55, connect the ends of the arms 49, 51, to the ends of arms 63, 65, of first and second bell crank members 57, 59, respectively. The links 53, 55, are attached by ball joints to the ends of arms 49, 51. The bell crank members 57, 59, are pivotably mounted in spaced relation on a vertical pivot rod 61 attached to the frame of the vehicle. The ends of the other arms 67, 69, of the bell crank members are pivotably connected to the deflector vane linkages 35, 33, respectively. Deflector vane linkage 35 includes a rod 71 pivotably connected at one end to arm 67 and at its other end pivotably connected to link 73 fixed to deflector vane 31. Deflector vane 31 is vertically pivotably mounted to casing or shell 3 for lateral movement. Similarly deflector vane linkage 33 includes a rod 75 connected to link 77 of vane 29.

The elongated collar member 47 is carried by an arm 81 which is forked at one end 83 to fit over the collar 47 and pivotably connected thereto by a pivot pin 84. The other end 85 of the arm has a cable 87 fixed to it. The arm 81 is pivotally supported intermediate its ends on support rod 61. The cable 87 passes over two spaced apart fixed pulleys 89, 81, and is connected at its ends to the panel linkage 27. The panel linkages 27, 25, comprise rods 93, 95, connected to the lower edges 97, 99, respectively of the panels 23, 21. The lower edges 97, 99, of the panels are opposite the edge at which the panels are pivotably connected within their respective steering ducts.

The rods 93, 95, are aligned, and their free ends connected together by a cable 103. The cable 103, joined to the ends of the rods, passes over two fixed pulleys 105, 107. The cable 103 also passes over a movable pulley 109 spaced laterally from the two fixed pulleys 105, 107. The movable pulley 109 is connected, through a length adjusting device 101 comprising a simple slide member similar to those used on cable control installations of outboard motors, to one end of a Bowden cable 111, the other end of which is connected to a member 113 extending upwardly from the control wheel 39. A spring tensioning means (not shown) maintains the cable 103 under tension.

The operation of the above described control system, using a single control member 37, follows.

Rotation of the control wheel 39 clockwise by the operator will cause the first bell crank member 67, through rod 45, arm 49 and link 53, to move rod 71 outward. This causes deflector vane 31 to move to the left when viewed in FIG. 2 and the air stream emerging from rear steering duct 19 will be deflected by the vane 31 causing the vehicle to turn right. The clockwise rotational movement of control wheel 39 simultaneously causes bellcrank 69 to move oppositely to bellcrank 67 thus moving vane 29 to the right and again causing the vehicle to turn right. Turning the control wheel in the opposite direction, or counter-clockwise, will reverse the movement of the linkages, bellcranks, rods and vanes and cause the vehicle to turn or rotate about its vertical axis in the opposite or left direction.

The control wheel 39 can also be moved laterally to the left or right thus pivoting rod 45 and collar 47 about the fork 83 of arm 81. This lateral movement will cause both the first and second bellcranks 67 and 69 to move in the same sense or direction. This causes both vanes 29 and 31 to pivot left or right simultaneously and the air stream emerging from both steering ducts 17, 19, will, upon hitting the pivoted vanes, provide a lateral component of thrust to the vehicle at both ends which is equal. Thus the vehicle will move sideways in either direction depending upon which lateral direction the steering wheel 39 is moved.

To move the vehicle forward or backward the control wheel 39 is pushed forward or pulled backward. If pushed forward, rod 45 and collar 47 move forward, causing arm 81 to pivot about support rod. The end 85 of arm 81 moves rearward and moves cable 87 with it. Cable 87 causes rod 93 to move in thus opening panel 23 and simultaneously will provide slack in cable 103 which is immediately taken up by movement of panel 21 to a more fully closed position. In this condition, more air flows out of rear steering duct 19 than out of front duct 17 thus providing a component of thrust to propel the vehicle forward. Rearward movement of control wheel 39 will provide a component of thrust to move the vehicle rearwardly. Axial movement of rod 45 and collar 47 will not appreciably move bellcranks 67 and 69 provided that the length of arms 63, 65, of the bellcranks is the same as the distance arms 49, 51, are from the center of collar 47 where it is pivoted to fork 83 of arm 81.

To raise or lower the vehicle the control wheel is raised or lowered. If the control wheel 39 is raised about pivot 43 the Bowden cable 111 is released through member 113, thus actuating the cable lengthening mechanism 101, allowing pulley 109 to move closer to pulleys 105, 107, and providing slack in cable 103 to allow both panels 21, 23, to close more fully. A greater proportion of the air flows through ducts 14, 16, thus raising the vehicle. If the control wheel 39 is lowered, both panels are more fully opened allowing a greater flow of air from ducts 17, 19, and correspondingly less from ducts 14, 16, thus lowering the vehicle.

The panels 21, 23, located in the ducts 17, 19, are mounted so that their free edges 99, 97, face into the air stream and thus they are held in place by the tensioning means in cable 103. Providing slack in cable 103 will cause the air flow to move the doors to shut-off position. This arrangement provides more positive control for the panels.

While the preferred form of the control system comprises mechanical linkages, it will be obvious that pneumatic or fluid pressure systems can be used in place of the mechanical linkages to control movement of the vehicle.

I claim:

1. A movement control system for use in air cushion supported vehicles having a single source of pressurized fluid providing the motive power for the vehicle and comprising first duct means for directing the flow of pressurized fluid from the source of fluid pressure in one direction to provide a cushion of air sufficient to support the vehicle, second and third duct means aligned in a fore and aft direction and communicating with the first duct means for normally directing a portion of the flow of pressurized fluid from the first duct means in fore and aft directions from the vehicle to provide opposing horizontal components of force acting on the vehicle to move said vehicle, valve means respectively in each of the second and third duct means for controlling the amount of fluid flowing through each of the second and third duct means, means mounting each valve means for movement toward a fully open or a fully closed position in the respective second and third duct means, a steering vane mounted on a vertical axis of rotation at the outlet of each of the second and third duct means, a single movable control member, means mounting said control member on said vehicle for universal movement, a first control means connecting the control member to said valve means for moving said valve means in unison toward a fully open position to thereby direct pressure through said second and third duct means or a fully closed position to thereby direct pressure through said first duct means, thereby causing the vehicle to rise when said valve means is in fully closed position or fall when said valve means is in fully open position, upon raising or lowering of the control member, second control means included in said first control means and connecting said control member to said valve means for moving said valve means in opposite directions toward fully open and fully closed positions, thereby causing the vehicle to move fore or aft upon moving the control member fore or aft, and further control means connecting the control member to said steering vanes to rotate the vanes about their vertical axes of rotation in the same direction, thereby causing the vehicle to rotate clockwise or counter-clockwise about a vertical axis substantially at the center of gravity of the vehicle upon rotation of the control member clockwise or counter-clockwise, said further control means connecting the control member to the steering vanes to rotate said vanes about their vertical axes in opposite directions, thereby causing the vehicle to move laterally of the fore and aft direction upon movement of the control member in lateral directions.

said further control means including a pair of bellcrank levers, one end of each lever being operatively connected to a respective steering vane, and linkage means operatively connecting the other ends of said bellcrank levers to said control member.

2. A control system as set forth in claim 1 in which said second and third ducts are rectangularly cross sectioned, said valve means in the respective ducts comprising a rectangular flap pivotally mounted along one edge of the flap nearest the outlet of the duct.

3. A control system as set forth in claim 2 in which said first control means includes further linkage means connected to said flaps and extending between the flaps, said further linkage means including a first cable system which can be adjusted in length, and a second cable system connected between the control member and said first cable system for controlling the length of said further linkage means.

4. A control system as set forth in claim 3 wherein said second cable system includes additional linkage means connected to said control member, whereby, upon said raising and lowering of said control member, the effective length of said further linkage means is controlled.

5. A system as set forth in claim 1 in which said control member mounting means includes a rotatable element connected to said control member, said linkage means connecting said opposite ends of said bell crank levers to said control member, whereby rotation of said rotatable element moves the other ends of the bellcrank levers in opposite directions, thereby producing opposite orientation of said steering vanes.

6. A system as set forth in claim 5 wherein said control member mounting means further includes means mounting said rotatable element for swinging movement about an axis normal to the axis of rotation of said rotatable element to thereby move other ends of said bellcrank levers in the same direction when said rotatable element is pivoted about said swing axis.

References Cited
UNITED STATES PATENTS

| | | | |
|---|---|---|---|
| 3,162,260 | 12/1964 | Cockerell | 180—122 |
| 3,208,543 | 9/1965 | Crowley | 180—121 |
| 3,412,956 | 11/1968 | Cockerell | 180—118X |

A. HARRY LEVY, Primary Examiner